United States Patent
Dellmann et al.

(10) Patent No.: US 9,087,553 B2
(45) Date of Patent: Jul. 21, 2015

(54) TAPE HEAD WITH THERMAL TAPE-HEAD DISTANCE SENSOR

(71) Applicant: International Business Machines Corporation, Armonk, NY (US)

(72) Inventors: Laurent A. Dellmann, Birmensdorf (CH); Johan B. C. Engelen, Zurich (CH); Simeon Furrer, Altdorf (CH); Mark Alfred Lantz, Adliswil (CH); Hugo E. Rothuizen, Oberrieden (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/250,727

(22) Filed: Apr. 11, 2014

(65) Prior Publication Data

US 2014/0320993 A1    Oct. 30, 2014

(30) Foreign Application Priority Data

Apr. 29, 2013 (GB) .................................. 1307697.1

(51) Int. Cl.
*G11B 21/02* (2006.01)
*G11B 27/36* (2006.01)
(Continued)

(52) U.S. Cl.
CPC ............ *G11B 27/36* (2013.01); *G11B 5/00813* (2013.01); *G11B 5/60* (2013.01)

(58) Field of Classification Search
CPC ............... G11B 2005/0021; G11B 2005/0005; G11B 5/012; G11B 5/02; G11B 19/02; G11B 5/6005; G11B 5/59633
USPC ............ 360/317, 122, 119.02, 65, 31, 60, 75, 360/77.13, 55
See application file for complete search history.

(56) References Cited

U.S. PATENT DOCUMENTS 7,508,612 B2 * 3/2009 Biskeborn et al. .............. 360/55
7,586,710 B2   9/2009 Partee et al.
(Continued)

FOREIGN PATENT DOCUMENTS

| WO | WO 0141132 A2 | 6/2001 |
| WO | WO 0141132 A3 | 12/2001 |
| WO | WO 0219330 | 3/2002 |

OTHER PUBLICATIONS

Evangelos Eleftheriou, Nanopositioning for storage applications, Preprints of the 18th IFAC World Congress, Aug. 28-Sep. 2, 2011,s http://www.nt.ntnu.no/users/skoge/prost/proceedings/ifac11-proceedings/data/ht ml/papers/3537.pdf.

(Continued)

*Primary Examiner* — Nabil Hindi
(74) *Attorney, Agent, or Firm* — Tutunjian & Bitetto, P.C.; Jeff Tang

(57) ABSTRACT

Tape head with thermal tape-head distance sensor to reduce the distance between the tape and the head to allow an increase in areal density. A tape head designed for reading and/or writing to a tape, including: a tape bearing surface shaped to form an air bearing when moving the tape with respect to the tape bearing surface; a thermal tape-head distance sensor circuit adapted to sense heat dissipated at the level of the tape bearing surface by the tape and thereby sense a distance between the tape bearing surface and the tape; and tape-head distance control means connected to the thermal tape-head distance sensor circuit to receive a signal provided by the tape-head distance sensor circuit and configured to alter the distance according to a signal received from the tape-head distance sensor circuit. This invention is further directed to a method of tape-head distance control for the above tape head.

20 Claims, 4 Drawing Sheets

(51) Int. Cl.
*G11B 5/008* (2006.01)
*G11B 5/60* (2006.01)

(56) References Cited

U.S. PATENT DOCUMENTS

| | | |
|---|---|---|
| 7,898,760 B2 * | 3/2011 | Biskeborn .................. 360/65 |
| 8,027,124 B2 | 9/2011 | Biskeborn et al. |
| 2003/0058559 A1 | 3/2003 | Brand et al. |
| 2007/0035881 A1 | 2/2007 | Burbank et al. |
| 2008/0112076 A1 | 5/2008 | Biskeborn |
| 2008/0225426 A1 | 9/2008 | Roy et al. |
| 2012/0113207 A1 | 5/2012 | Zheng |
| 2012/0262818 A1 | 10/2012 | Biskeborn et al. |

OTHER PUBLICATIONS

DW Jones, Controlling Tape/Head Clearance at the Entrance and the Exit of a Rotating Head Mandrel, Oct. 1, 1974, IP.com Prior Art Database Discl., http://ip.com/IPCOM/000082214.

G. Cherubini et al., Control methods in data-storage systems, IEEE Transactions on control systems technology, Mar. 2012, vol. 20, No. 2, http://ieeexplore.ieee.org/stamp/stamp.jsp?tp=&arnumber=6104200.

* cited by examiner

TAPE HEAD WITH THERMAL TAPE-HEAD DISTANCE SENSOR

CROSS-REFERENCE TO RELATED APPLICATION

This application claims priority under 35 U.S.C. §119 from United Kingdom Patent Application No. 1307697.1 filed Apr. 29, 2013, the entire contents of which are incorporated herein by reference.

BACKGROUND OF THE INVENTION

The present invention relates to the field of tape heads. More particularly, the present invention is related to magnetic tape data storage and tape recorders that include such heads.

To write and read at the high areal densities used by modern tape systems, the magnetic tape has to be in close proximity to the read/write elements on a tape read/write head. Research efforts are spent on finding a viable solution to reduce the distance between the tape and the head because reducing this spacing allows for an increase in the areal density.

When a tape is streamed over a surface an air bearing forms, which prevents the tape from coming into close contact with the head. As a result, minimal tape-head distances can not reach the nanometer-range. A solution that was developed and that current tape heads typically use is to rely on skiving (i.e., sharp) edges to scrape off (skive off) the air. This forms a low pressure region directly after the skiving edge, such that the tape is pushed into intimate contact with the tape head due to the higher air pressure on the opposite side of the tape. An advantage of this solution is that the tape-head spacing is small and stable over a wide range of tape speeds. A disadvantage is that friction and wear arise due to the direct contact. To prevent excessive friction, the tape can be intentionally made rough (i.e. with sporadic bumps on the tape surface) so that only a fraction of the tape surface is in actual contact with the tape bearing surface of the head. Effectively, these bumps increase the tape-head spacing. Now, to increase the linear density, one can seek to reduce the tape-head spacing by using a smoother tape. However, using a smoother media results in an increased friction that can degrade the recording and read back performance of the tape drive. In extreme cases, friction can even cause the tape drive motors to stall and cause tape breakage.

In the related technical field of hard disk drives (HDDs), the magnetic medium is not in direct contact with the read/write head. There is an air bearing between the head and the disk. Because the disk is a rigid surface, the head can be pushed towards the disk to reduce the air bearing thickness such that the disk-head spacing is only a few nanometers. This can be compared with, typically, several tens of nanometers for tape media. The non-contact recording in an HDD virtually eliminates head wear, while operating at very small disk-head spacing.

SUMMARY OF THE INVENTION

A tape head, designed for reading and/or writing to a tape, including: a tape bearing surface, shaped to form an air bearing when moving the tape with respect to the tape bearing surface; a thermal tape-head distance sensor circuit, adapted to sense heat dissipated at a level of the tape bearing surface by the tape and thereby sense a distance between the tape bearing surface and the tape; and a tape-head distance control means connected to the thermal tape-head distance sensor circuit to receive a signal provided by the tape-head distance sensor circuit and configured to alter the distance according to the signal.

A method of tape-head distance control for a tape head, the method including: circulating a tape with respect to the tape head to form an air bearing between the tape and a tape bearing surface; sensing via a thermal tape-head distance sensor circuit a distance between the tape bearing surface and the tape moving with respect to the tape bearing surface; and altering said distance according to a signal received from the tape-head distance sensor circuit.

DETAILED DESCRIPTION OF THE PREFERRED EMBODIMENT

Figure 1:
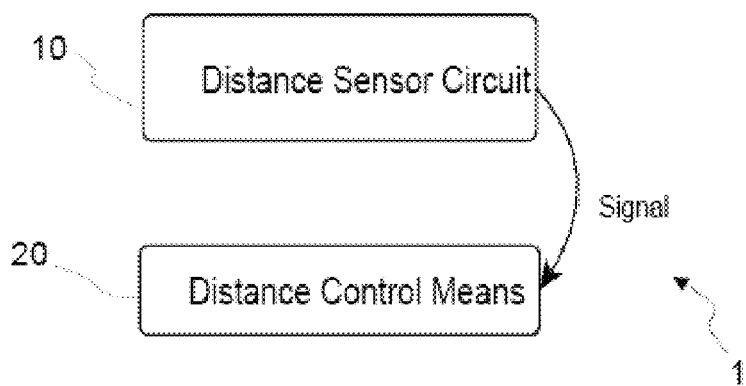
FIGS. 1 to 4 are block diagrams schematically illustrating selected components of tape heads according to embodiments of the present invention as well as their high-level functional relationships.

According to a first aspect, the present invention is embodied as a tape head, designed for reading and/or writing to a tape, including: a tape bearing surface, shaped to form an air bearing when moving the tape with respect to the tape bearing surface, in operation; a thermal tape-head distance sensor circuit, adapted to sense heat dissipated at the level of the tape bearing surface by the tape, and thereby sense a distance between the tape bearing surface and the tape, in operation; and tape-head distance control means connected to the thermal tape-head distance sensor circuit to receive a signal provided by the tape-head distance sensor circuit, and configured to alter said distance according to a signal received from the tape-head distance sensor circuit.

In the embodiments of the present invention, the tape-head distance control means is configured to keep said distance substantially constant. Preferably, the tape-head distance control means includes a closed-loop feedback control circuit, configured to provide closed-loop feedback control of said distance according to a signal received from the tape-head distance sensor circuit. In preferred embodiments of the present invention, the tape bearing surface includes non-skiving edges. Preferably, all edges of the tape bearing surface are non-skiving edges.

In embodiments of the present invention, the tape-head distance control means includes electrostatic attractors coupled in the control means to cause to alter the distance according to a signal received from the tape-head distance sensor circuit.

Preferably, the thermal tape-head distance sensor circuit includes: a heater element, arranged at the tape bearing surface such as to be in thermal communication with the tape, in operation; and a heating circuit connected to the heater element, such as to be able to provide power to the heater element and heat it, the heating circuit being preferably configured to provide constant power to the heater element. In preferred embodiments, the heater element includes a resistive structure, the resistive structure thermally insulated from elements of the tape bearing surface surrounding it and preferably is arranged in a cavity forming an air gap partly surrounding the resistive structure.

In embodiments of the present invention, the thermal tape-head distance sensor circuit further includes a temperature measurement circuit coupled in the thermal tape-head distance sensor circuit to sense the temperature of the heater element. The temperature measurement circuit preferably includes: an electrical resistance measurement circuit connected to the heater element to sense its resistance; or both an electrical resistance measurement circuit and a non-linear resistive electronic component (such as a transistor or a diode), the electrical resistance measurement circuit connected to the non-linear resistive electronic component to sense the temperature of the heater element.

In embodiments of the present invention, the temperature measurement circuit includes an electrical resistance measurement circuit connected to the heater element. The electrical resistance measurement circuit together with the heating circuit form a combined heating and resistance measurement circuit configured so that an electrical current that the combined circuit uses to sense the resistance is also used to heat the heater element. Preferably, the temperature measurement circuit includes an electrical resistance measurement circuit that is a 2-wire resistance measurement circuit or a 4-wire resistance measurement circuit. In preferred embodiments of the present invention, the temperature measurement circuit includes an electrical resistance measurement circuit and the electrical resistance measurement circuit includes an AC current and/or voltage source.

Preferably, the temperature measurement circuit includes an electrical resistance measurement circuit that includes: a constant current source and a voltage meter, whereby the signal provided by the tape-head distance sensor circuit depends on changes in a voltage measured by the voltage meter; or a constant voltage source and current meter, whereby the signal provided by the tape-head distance sensor circuit depends on changes in a current measured by the current meter.

In embodiments of the present invention, the thermal tape-head distance sensor circuit further includes at least one reference temperature sensor, the latter connected in the sensor circuit, such as for the thermal tape-head distance sensor circuit, to provide a signal corrected according to a reference signal provided by the at least one reference temperature sensor.

According to another aspect, the invention is embodied as a method of tape-head distance control for a tape head according to any one of the above embodiments, the method including: circulating a tape with respect to the tape head, to form an air bearing between the tape and the tape bearing surface; sensing via a thermal tape-head distance sensor circuit a distance between the tape bearing surface and the tape moving with respect to the tape bearing surface; and altering said distance according to a signal received from the tape-head distance sensor circuit.

Devices and methods embodying the present invention are described below by way of non-limiting examples and in reference to the accompanying drawings. Technical features depicted in the drawings are not to scale. The following description is structured as follows. First, general embodiments and high-level variants are described (sect. 1). The next section addresses more specific embodiments and technical implementation details (sect. 2).

1. General Embodiments and High-Level Variants

Experience gained with HDDs can prompt persons skilled in the art to try non-direct contact solutions for tape media similar to what is done in HDDs. However, because a tape is a very thin and flexible medium, one cannot simply push or urge a tape head towards the tape to reduce the air bearing in the same way as for HDDs. To solve this problem, one can try to urge or pull the magnetic tape towards the head and thus reduce the thickness of the air bearing. One can for instance contemplate using electrostatic elements to that aim. Unfortunately, the electrostatic force increases as the distance between the two electrodes (i.e., the tape and the head decreases). As a result, and at least for some types of heads and tapes, one observes a tendency for the tape to jump into contact with the head. Tests performed by the present inventors have also shown this observation.

The solution to this problem, which is the subject of the present invention, is to use a specific type of proximity sensor. More precisely, a tape-head distance sensor circuit is relied upon, which dynamically senses the tape-head distance as an active feedback to alter, as necessary, and thereby control the tape-head distance. Now, to implement such a feedback system in practice, a sensor capable of measuring the ever-changing tape-head distance is needed. Usual proximity sensors are known to be based on capacitive effect, Doppler effect, inductive effect, Laser rangefinder, passive optical, passive thermal infrared, photocell, etc. However, the present inventors have concluded that none of such devices are suited to the present context. Therefore, the present invention uses a non-passive thermal sensor in order to sense the tape-head distance. This sensor is not a passive sensor inasmuch as it does not rely on thermal energy given off by the tape. Rather, the sensor involved senses the heat dissipated by the moving tape at the level of the tape bearing surface. To that aim, the tape bearing surface needs be suitably shaped.

More precisely, and in reference to FIGS. 1 to 6, the proposed tape head 1 makes use of a tape bearing surface 11, which is shaped such as to form an air bearing 40 when moving the tape with respect to the surface 11, in operation. This air bearing plays two roles. First, it gives some room (i.e., a gap) to allow for altering the tape-head distance. More precisely, the air bearing plays the role of a deformable media, a "spring," against which the tape can be urged. Second, when streaming the tape 30 over the surface 11, the air flow 40 that it creates can slightly contribute to dissipate heat at the surface. However, it is mainly the tape that dissipates the heat as the tape can come very close to the head. Thus, temperature sensing is very sensitive to changes in the tape-head distance. As the tape gets closer to the surface 11, it gradually changes the temperature at the surface 11. This change can be sensed by the thermal sensor circuit 10. As the latter senses heat dissipated at the surface 11, it can thereby sense the tape-to-head distance d, which varies correlatively. Finally, tape-head distance control means 20, which are connected to the sensor circuit 10, are configured to alter the tape-head distance d according to a signal received from the sensor circuit 10. The proposed tape head 1 can otherwise have a number of usual features, e.g., be a read and/or write head, i.e., having at least one read and/or write element for reading from and/or writing to magnetic tape. The above tape head 1 can also be formed as a servo write head.

According to another aspect, the present invention can be embodied as a method of tape-head distance control for a tape head 1 such as described above or in any of the embodiments discussed below. Basically, the method includes: circulating the tape 30 with respect to the tape head 1, i.e., streaming the tape 30 over the tape bearing surface to form the air bearing 40 between the tape and the surface; sensing (via the thermal sensor circuit 10) the distance d between the tape bearing surface and the tape moving with respect to the tape bearing surface; and altering the distance according to a signal received from the sensor circuit 10. The steps of altering and sensing are performed correlatively while streaming the tape. Still, the circuits 10, 20 can be started before starting to stream the tape, or even, after a delay after starting to stream the tape (e.g., to operate in normal streaming conditions or on the contrary to operate only in specific conditions).

Thanks to the above solution, a fine tape-head distance control is achieved that allows for using smoother tape without increasing the friction. As noted in the introduction, this leads to a significantly reduced tape-head spacing which in turn allows for increasing the linear density. Moreover, the above solution leads to a reduced contact force between tape and head, which reduces head wear significantly and, in turn, is beneficial in terms of lifetime of the head and the media.

Note that prior art suggests the use of thermal sensors in tape heads. However, such thermal sensors are used for subtracting a signal from the magnetic readback signal, rather than for sensing a tape-head distance or for distance control.

In addition, as evoked earlier, the tape-head distance control means 20 can include one or more electrostatic elements, such as electrostatic attractors 24, suitably coupled to enable easy distance control. Electrostatic elements can be arranged at the level of the surface 11 [e.g., adjacent to the read and/or write elements (not shown)]. Further, the control means 20 can include a controller 22c (as explicitly shown in FIG. 6) for applying a potential to the electrostatic elements. One general idea is that by applying a defined potential to the electrostatic elements, the electrostatic elements can be controlled so as to exert an electrostatic force on the magnetic tape. In doing this, a distance between the tape bearing surface 11 and the magnetic tape 30 can be controlled. For example, the distance can be controlled to remain within 40 nm, preferably 20 nm, and more preferably within 10 nm. Note that, ideally, the distance is 0.0 nm. The force pulling the magnetic tape towards the read and/or write head or the read and/or write element can also be controlled. For example, the force can be controlled to be in the range of 0 to 10 N. The force is dependent on the applied voltage and the surface area spanned by the electrostatic elements.

All relevant parameters can be tried and varied to reach the desired result, using a systematic test routine or simulation. A higher voltage results in more force and a smaller surface area results in a smaller force. Typically, magnetic tape includes a number of thin conductive and dielectric layers. Thus, when the magnetic tape is brought close to an electrostatic element, image charges appear on the magnetic tape, i.e. there is a charge separation within the tape due to the external electric field generated by the at least one electrostatic element, when the potential is applied by the controller. As a result, the magnetic tape is attracted to the at least one electrostatic element. Furthermore, by statically or dynamically controlling the potential applied to the at least one electrostatic element by the controller, the electrostatic force exerted on the magnetic tape can be controlled to achieve the desired spacing or force mentioned above.

The control means 20, 22c can most generally be configured as an open or closed-loop feedback controller to control the distance. Preferably yet, a simple way of dynamically monitoring the tape-head distance is to configure the distance control means 20 as a closed-loop feedback control circuit 22 (FIGS. 3, 4 and 6), thereby providing closed-loop feedback control of the distance based on the signal received from the sensor circuit 10. This way, the tape-head distance can be kept substantially constant (e.g., at a distance of 20±1 nm). In turn, better read/write performance and higher linear densities is achieved.

Figure 6:
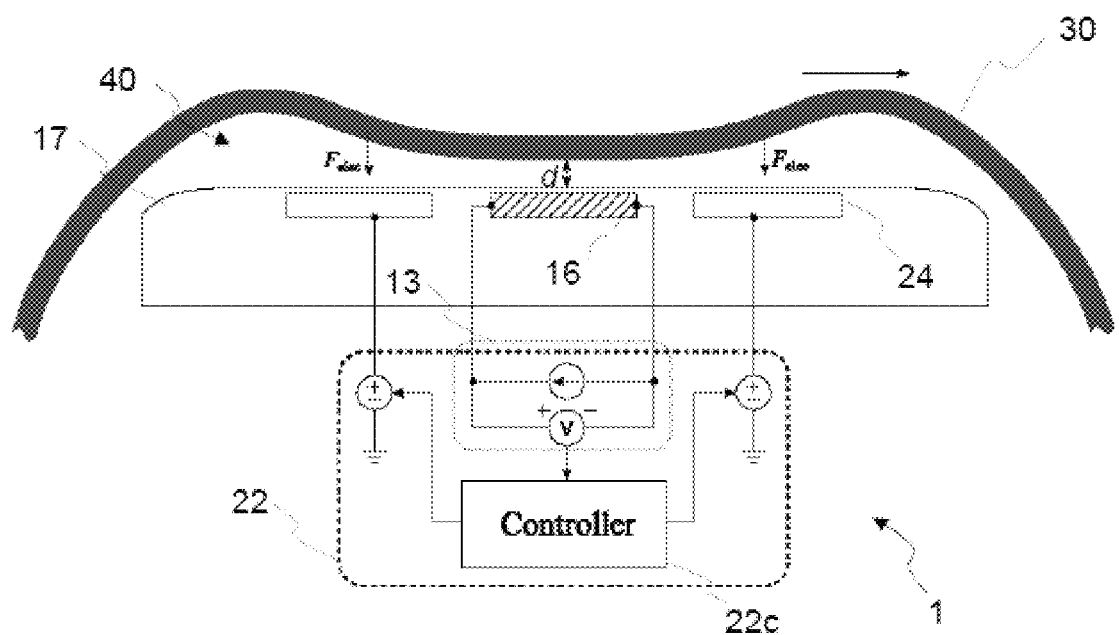
FIG. 6 is a cross-sectional view that schematically illustrates selected components of a thermal tape-head distance sensor circuit and tape-head distance control means according to embodiments of the present invention.

As illustrated in FIG. 6, the tape bearing surface can include non-skiving edges 17, such as to form an air bearing 40 when moving the tape with respect to the tape bearing surface 11. This is in contrast to most prior art solutions, which today use skiving edges to push the tape into intimate contact with the tape head. Incidentally, all edges 17 defining the tape bearing surface can be non-skiving edges to favor the formation of an air-bearing.

Although various types of thermal sensors can be contemplated for use in the present invention (i.e., thermocouples, thermistors, resistance thermometers, etc.), resistance thermometers (also called resistance temperature detectors or RTDs) are preferred. The reason RTDs are preferred is because of the ease of fabrication and because they can further be easily adapted to the present context to combine heater and sensor functionality, which is discussed later. Such devices are otherwise generally known per se: they allow for measuring temperature by correlating the resistance of a resistive element tested with temperature. However, in the present case there is no need to correlate with temperature. Rather, this is the tape-head distance (or any quantity representative thereof) that needs to be correlated with the temperature-dependent resistance of the resistive element of the RTD.

Figure 5:
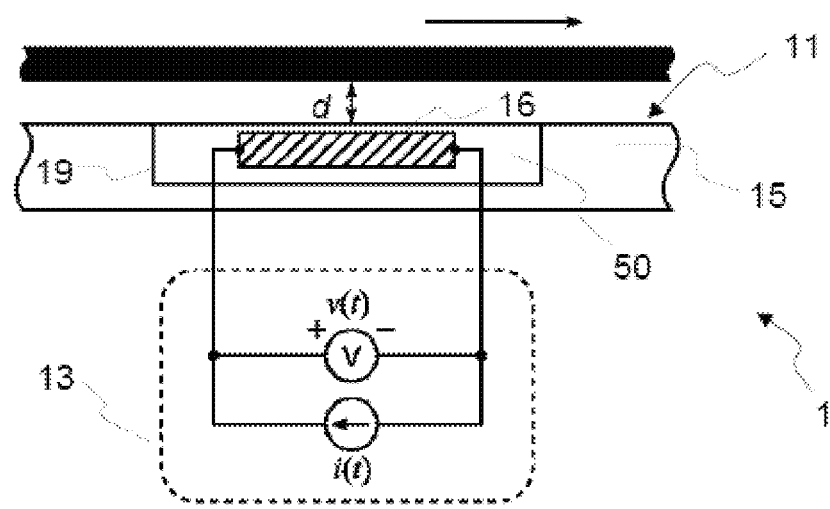
FIG. 5 is a cross-sectional view that schematically illustrates selected components of a thermal tape-head distance sensor circuit including a 2-wire electrical sensing circuit.

More preferably, and as illustrated in FIGS. 5-6, one uses a heater element 16 arranged at the tape bearing surface 11, so as to be in thermal communication with the tape 30, in operation. In addition, a heating circuit 13, 14 is connected to the heater element 16, such as to provide power to the heater element and thus heat it. Experiments conducted so far have shown that a temperature increase of a couple of degrees above the ambient temperature suffices. Measuring precisely the temperature increase is not easy, as the resolution depends on the temperature. Yet, the temperature increase sought can be up to 10s of degrees. On the other hand, the temperature increase must be limited, else the tape will deform. Thus, more power than would in fact be necessary to sense its resistance is provided to the heater element. A higher heater temperature results in a larger change of temperature and hence better resolution and one can optimize the heating power to provide optimal resolution within the limits of e.g. allowable temperatures without damaging the head or tape. Best results were obtained when providing constant power to the heater element 16.

Preferably, the heater element includes a resistive structure 16, thermally insulated from surrounding elements 15, 24 of the tape bearing surface, to prevent heat dissipation within the head. To that aim, the resistive structure 16 can be arranged in a cavity 19 that forms an air gap 50 surrounding the resistive structure (at least partly). As air is a good insulator, one seeks to have the resistive element arranged and maintained in the cavity such as to be as much as possible surrounded by air. Now, any other insulating material can be contemplated. Preferably, one uses a solid insulating material, as an air cavity can fill up with particles or dust arising from streaming tapes over the head (even though the tape would not be in direct contact most of the time).

Figure 2:
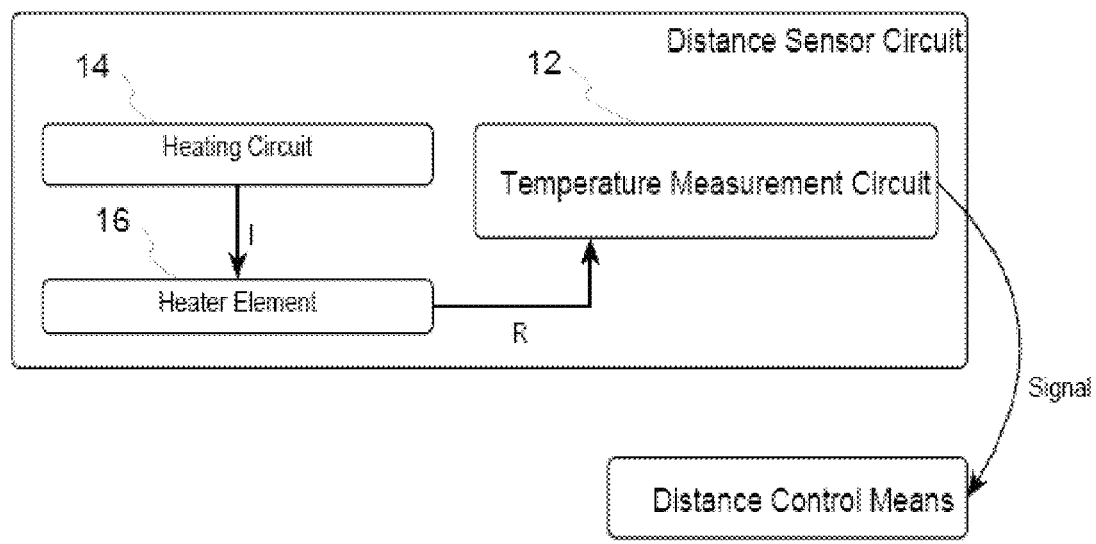
Figure 3:
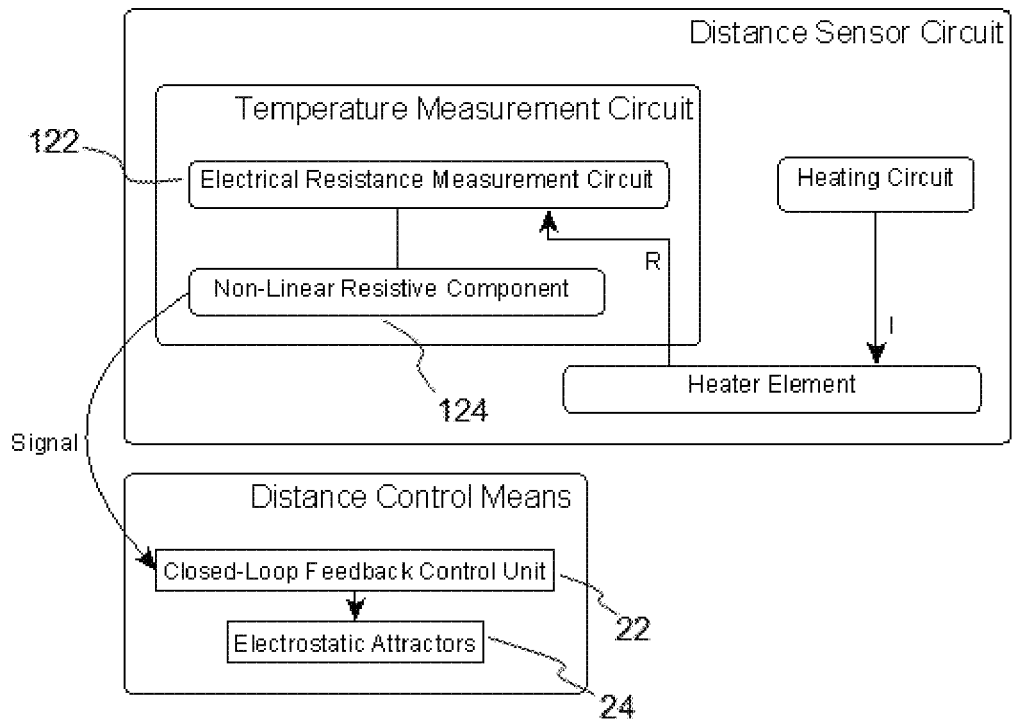
Figure 4:
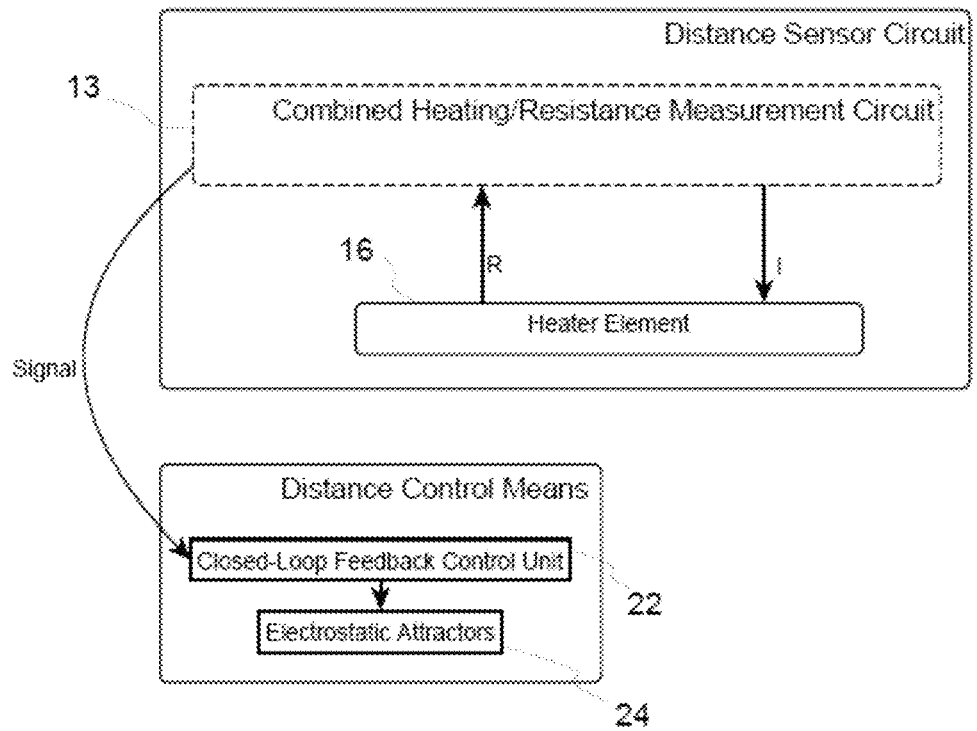

Accordingly, and referring now more specifically to FIG. 2, 3, or 4, the thermal sensor circuit 10 can include a temperature measurement circuit 12, 13, coupled in the circuit 10 to sense the temperature of the heater element 16 or equivalently any quantity varying correlatively with the temperature dependent resistance of the element 16. In fact, this temperature measurement circuit can either include: (i) an electrical resistance measurement circuit 122 (suitably connected to the heater element 16 to sense its resistance); or (ii) both an electrical resistance measurement circuit 122 and a non-linear resistive electronic component 124 such as a transistor or a diode. In the latter case, thermal sensor circuit 10 is augmented with a nonlinear element in order to enhance its sensitivity, as known per se in the field of thermo-sensors.

Note that, instead of having two distinct circuits 12 and 14 as illustrated in FIGS. 2-3 respectively for sensing the temperature and heating, one can instead advantageously combine circuits 12 and 14 into a single circuit 13 to form a combined heating and resistance measurement circuit designed such that an electrical current, which the combined circuit uses to sense the resistance, is also used to heat the heater element. Such embodiments are depicted in FIGS. 4 and 6. This combination is advantageous because it is more compact and requires less power in operation. It also is easier to design and requires fewer components.

Referring now to FIGS. 5 and 6, the electrical resistance measurement circuit 122 can simply be a 2-wire resistance measurement circuit. In variants, a 4-wire resistance measurement circuit can be used instead, to increase the accuracy and reliability of the resistance measured.

Preferably, the electrical resistance measurement circuit 122 includes a constant current source and a voltage meter. In that case, the signal provided by the distance sensor circuit 10 depends on changes in the voltage measured by the voltage meter, as illustrated in FIGS. 5-6. In variants, a constant voltage source and current meter are used, whereby the signal provided by the tape-head distance sensor circuit depends on changes in a current measured by the current meter. Still, the source current/voltage does not have to be constant; it can be an AC current/voltage for an improved signal-to-noise ratio using lock-in techniques. Furthermore, the thermal tape-head distance sensor circuit can include one or more reference temperature sensors to correct the signal according to reference temperature(s) and to reduce sensitivity to ambient conditions.

The embodiments above have been mainly described in reference to a device, (i.e., a tape head 1). Yet, the present invention can be equally described in terms of method steps. Beyond the essential aspects of such a method, which have been described earlier, the method can be embodied to include one or more of the following steps:

the tape-head distance control means 20 instructs to alter and thereby control the distance d according to a signal received from the tape-head distance sensor circuit to keep the distance d at a substantially constant value;

the tape-head distance control means 20 includes a closed-loop feedback control circuit 22 and accordingly provides closed-loop feedback control of said distance;

the tape-head distance control means 20 can switch a heating circuit 13, 14 connected to the heater element 16 to provide power thereto, preferably configured to provide constant power;

a combined heating and resistance measurement circuit 13 uses electrical current to both sense the resistance and also to heat the heater element;

the signal provided by the tape-head distance sensor circuit depends on changes in a voltage measured by a voltage meter, see FIG. 6, or conversely on changes in a current measured by a current meter; and/or the sensor circuit provides a signal corrected according to a reference signal provided by one or more reference temperature sensors; etc.

The above embodiments have been succinctly described in reference to the accompanying drawings and can accommodate a number of variants. Several combinations of the above features can be contemplated. Examples are given in the next section.

2. Specific Embodiments/Technical Implementation Details

Thermal displacement sensing has been shown to work especially well when the object to which distance is to be measured has a large thermal mass. As modern tapes can have a thickness down to 4-6 microns only, it is not obvious that such tapes ensure enough heat dissipation to be able to measure and control the distance. To address this further issue, particularly preferred embodiments include a tape head 1 as depicted in FIG. 5 or 6, which has no skiving edge delimitating the tape head surface 11, such that an air bearing is formed. The tape head 1 further includes a thermal tape-head sensor 10 and means 20 for altering the tape-head spacing, which notably involve electrostatic attractors. The tape-head spacing is kept at a desired value by closed-loop feedback control. Consider a heater element 16 close to the (air bearing) surface of the tape head as depicted in FIG. 5. The heater element is heated by applying a constant current or voltage and its temperature depends on how easily heat dissipates into its surroundings. When the tape gets closer to the heater element, there is less thermal resistance between the element and the tape and more heat dissipates through the tape and air. This lowers the temperature of the heated element. By monitoring the temperature of the heater element, one obtains a measure of the spacing between tape and the heater element. The temperature of the heater element is measured by sensing the electrical resistance of the heater element. The latter has a temperature-dependent resistance and is, e.g., a metal or semiconductor. The electrical current that is used to measure the resistance is also used to heat the element 16, as illustrated in FIG. 6. In practice the heater can also be heated with a constant current and the change in voltage can be used as a feedback signal or a constant voltage can be applied and the change in current that results from a change in temperature can be used as the feedback signal.

FIG. 6 shows a schematic drawing of a system where the tape-head spacing is closed-loop controlled, using a thermo-resistive spacing sensor and electrostatic attractors. A higher sensor operating temperature increases the sensitivity. In addition, reducing the thermal 'mass' of the sensor also increases sensitivity, i.e. a reduced sensor volume and/or better thermal insulation from the rest of the head for example by etching an air gap around and below the sensor element.

Figure 7:
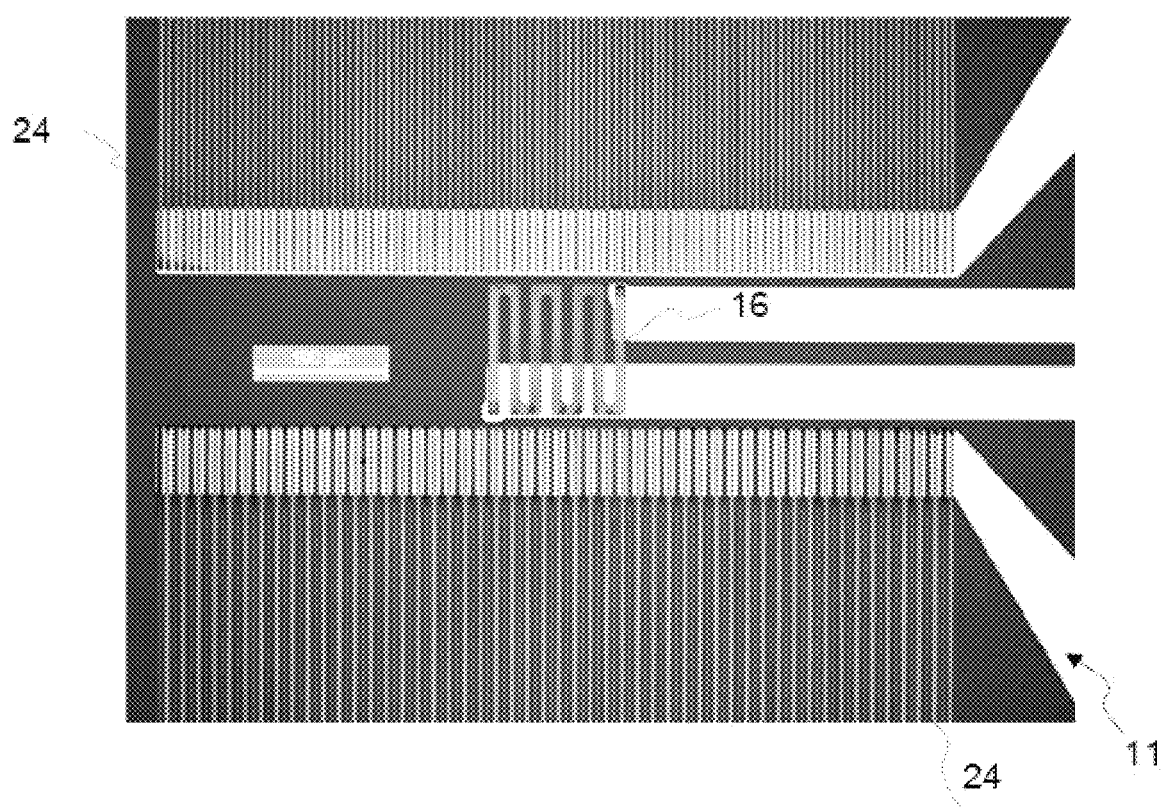
FIG. 7 is an optical micrograph of a thermo-resistive sensor element and two electrostatic attractors arranged on a tape bearing surface of a tape head according to embodiments of the present invention.

FIG. 7 is an optical micrograph showing an example of a possible design for the arrangement of the thermo-resistive sensor front element 16 and two electrostatic attractors 24 on a tape bearing surface 11. More generally, both the read/write elements (not shown) and the electrostatic elements 24 can be arranged on a substrate (not shown) of the head. The substrate can be formed as a wafer, for example a silicon or AlTiC wafer. The read and/or write elements and the electrostatic elements are electrically isolated from each other. The electrostatic elements 24 can include titanium-nitride (TiN), iron-nitride and an additional element X (FeXN where X=Ti, Al, Hf, CoHf or CrHf), nickel-iron (NiFe), doped diamond like carbon (DLC), tungsten or, generally, any suitable conductive material (e.g., metal).

The control means (or controller) 20, 22c can include distinct voltage sources for applying voltages to distinct electrostatic elements, in which voltage sources can be configured as controllable voltage sources. For example, the voltages can vary as a function of time. The tape drive can also include tensioning units (not shown) arranged on either side of the tape head to apply a tension to the magnetic tape 30. As a result, when no electric potential is applied to the electrostatic elements, the tape is spaced apart from the surface (e.g., at a distance between 1 and 100 µm). During normal operation of the tape system, data and/or a servo pattern is read from/written to the tape. If the signal received from circuit 10 indicates a too large distance d, a voltage is supplied to the electrostatic elements by the controller 20, 22. As a result of electrostatic forces between the electrostatic elements 24 and the tape 30, at least those sections of the tape 30 vis-á-vis elements 24 shall be pulled in closer relationship to the surface 11. A closed-loop feedback can allow for constant distance to be maintained, preferably in the range of 10 to 200 nm or less. The distance values given herein are values averaged over time and space (considering the tape exposed to the overall surface 11), which can be measured by fitting an analytical tape-head spacing model to the magnetic readback signal obtained from erased tape or from specific periodic patterns written to tape.

While the present invention has been described with reference to a limited number of embodiments, variants, and the accompanying drawings, it is understood by those skilled in the art that various changes can be made and equivalents can be substituted without departing from the scope of the present invention. In particular, a feature (device-like or method-like) recited in a given embodiment, variant, or shown in a drawing can be combined with or replace another feature in another embodiment, variant, or drawing without departing from the scope of the present invention. Various combinations of the features described in respect to any of the above embodiments or variants can accordingly be contemplated that remain within the scope of the appended claims. In addition, many minor modifications can be made to adapt a particular situation or material to the teachings of the present invention without departing from its scope. Therefore, it is intended that the present invention not be limited to the particular embodiments disclosed, but that the present invention includes all embodiments falling within the scope of the appended claims. In addition, many other variants other than those explicitly touched above can be contemplated. For example, another insulator other than air can be contemplated to thermally insulate element 16.

The invention claimed is:

1. A tape head for reading and/or writing to a tape, comprising:
   a tape bearing surface for forming an air bearing when the tape moves with respect to the tape bearing surface;
   a thermal tape-head distance sensor circuit adapted to sense heat dissipated at a level of the tape bearing surface by the tape thereby sensing a distance between the tape bearing surface and the tape; and
   a tape-head distance control means connected to the thermal tape-head distance sensor circuit to receive a signal provided by the tape-head distance sensor circuit, wherein the tape-head distance control means is configured to alter the distance according to the signal.

2. The tape head according to claim 1, wherein the tape-head distance control means is configured to keep the distance substantially constant.

3. The tape head according to claim 1, wherein the tape-head distance control means comprises a closed-loop feedback control circuit configured to provide closed-loop feedback control of the distance according to the signal received from the tape-head distance sensor circuit.

4. The tape head according to claim 3, wherein the tape bearing surface comprises non-skiving edges.

5. The tape head according to claim 4, wherein all edges of the tape bearing surface are non-skiving edges.

6. The tape head according to claim 5, wherein the tape-head distance control means comprises a plurality of electrostatic attractors coupled in the control means to cause to alter the distance according to the signal received from the tape-head distance sensor circuit.

7. The tape head according to claims 6, wherein the thermal tape-head distance sensor circuit comprises:
   a heater element arranged at the tape bearing surface such as to be in thermal communication with the tape in operation; and
   a heating circuit connected to the heater element, such as to be able to provide power to the heater element and heat it.

8. The tape head according to claim 7, wherein the heating circuit is configured to provide constant power to the heater element.

9. The tape head according to claim 8, wherein the heater element comprises a resistive structure thermally insulated from surrounding elements of the tape bearing surface.

10. The tape head according to claim 9, wherein the heater element is arranged in a cavity forming an air gap partly surrounding the resistive structure.

11. The tape head according to claim 10, wherein the thermal tape-head distance sensor circuit further comprises a temperature measurement circuit coupled in the thermal tape-head distance sensor circuit to sense the temperature of the heater element.

12. The tape head according to claim 11, wherein the temperature measurement circuit comprises:
    an electrical resistance measurement circuit connected to the heater element to sense its resistance.

13. The tape head according to claim 12, wherein the temperature measurement circuit comprises:
    the electrical resistance measurement circuit; and
    a non-linear resistive electronic component, wherein the electrical resistance measurement circuit is connected to the non-linear resistive electronic component to sense the temperature of the heater element.

14. The tape head according to claim 13, wherein the temperature measurement circuit comprises the electrical resistance measurement circuit connected to the heater element, where the electrical resistance measurement circuit together with the heating circuit form a combined heating and resistance measurement circuit configured such that an electrical current that the combined circuit uses to sense the resistance is also used to heat the heater element.

15. The tape head according to claim 14, wherein the temperature measurement circuit comprises the electrical resistance measurement circuit that is a 2-wire resistance measurement circuit.

16. The tape head according to claim 14, wherein the temperature measurement uses comprises the electrical resistance measurement circuit that is a 4-wire resistance measurement circuit.

17. The tape head according to claim 14, wherein the temperature measurement circuit comprises the electrical resistance measurement circuit and the electrical resistance measurement circuit comprises an AC current and/or voltage source.

18. The tape head according to claim 16, wherein the temperature measurement circuit comprises the electrical resistance measurement circuit, wherein the electrical resistance measurement circuit comprises:

a constant current source and a voltage meter, whereby the signal provided by the tape-head distance sensor circuit depends on changes in a voltage measured by the voltage meter; or a constant voltage source and a current meter, whereby the signal provided by the tape-head distance sensor circuit depends on changes in a current measured by the current meter.

19. The tape head according to claim 18, wherein the thermal tape-head distance sensor circuit further comprises an at least one reference temperature sensor, wherein the at least one reference temperature sensor is connected in the sensor circuit to provide a signal corrected according to a reference signal provided by the at least one reference temperature sensor.

20. A method of tape-head distance control for a tape head, the method comprising:
    circulating a tape with respect to the tape head to form an air bearing between the tape and a tape bearing surface;
    sensing via a thermal tape-head distance sensor circuit a distance between the tape bearing surface and the tape moving with respect to the tape bearing surface; and
    altering said distance according to a signal received from the tape-head distance sensor circuit.

* * * * *